United States Patent [19]

Sander

[11] 3,970,173

[45] July 20, 1976

[54] DEVICE IN A FLUID PRESSURE ACTUATED BRAKE UNIT FOR ENABLING THE OUTGOING PUSH ROD TO BE BROUGHT BACK FROM THE OUTSIDE

[75] Inventor: Nils Borje Lennart Sander, Malmo, Sweden

[73] Assignee: Svenska Aktiebolaget Bromsregulator, Malmo, Sweden

[22] Filed: June 11, 1975

[21] Appl. No.: 585,813

[30] Foreign Application Priority Data

June 24, 1974 Sweden.............................. 7408249

[52] U.S. Cl............................. 188/203; 188/196 D
[51] Int. Cl.²........................................ F16D 65/56
[58] Field of Search......... 188/196 D, 196 BA, 202, 188/203, 79.5 R, 79.5 GE

[56] References Cited

UNITED STATES PATENTS 3,589,480  6/1971  Axelsson..................... 188/196 D X Primary Examiner—Duane A. Reger
Attorney, Agent, or Firm—Laurence R. Brown

[57] ABSTRACT

A single acting pneumatic brake assembly is constructed to permit the push rod to be returned by external force when brakes are replaced, and the like. Thus, two pairs of clutch surfaces are both disengaged while the push rod is returned by pressure applied between a stationary part and a movable member of the assembly such as the push rod and wheel. A movable clutch member holds the clutch surfaces open during return of the push rod. A spring holds one clutch surface closed until overcome by pressure to return the push rod.

1 Claim, 2 Drawing Figures

DEVICE IN A FLUID PRESSURE ACTUATED BRAKE UNIT FOR ENABLING THE OUTGOING PUSH ROD TO BE BROUGHT BACK FROM THE OUTSIDE

This invention relates to a device in a fluid pressure actuated brake unit with a single-acting slack adjuster for enabling the outgoing push rod of the unit to be brought back from the outside, the unit including a rotatable element in non-self-locking engagement with a non-rotatable element, two conical clutch surfaces one on each side of a flange on the rotatable element, two corresponding clutch surfaces on the piston of the unit at a greater distance from each other than the former clutch surfaces, and a so arranged adjuster spring that the front pair of clutch surfaces as viewed in the brake application direction normally is kept engaged but will be brought out of engagement at a force on the push rod in the direction opposite the brake application direction exceeding the spring force.

Figure 1:
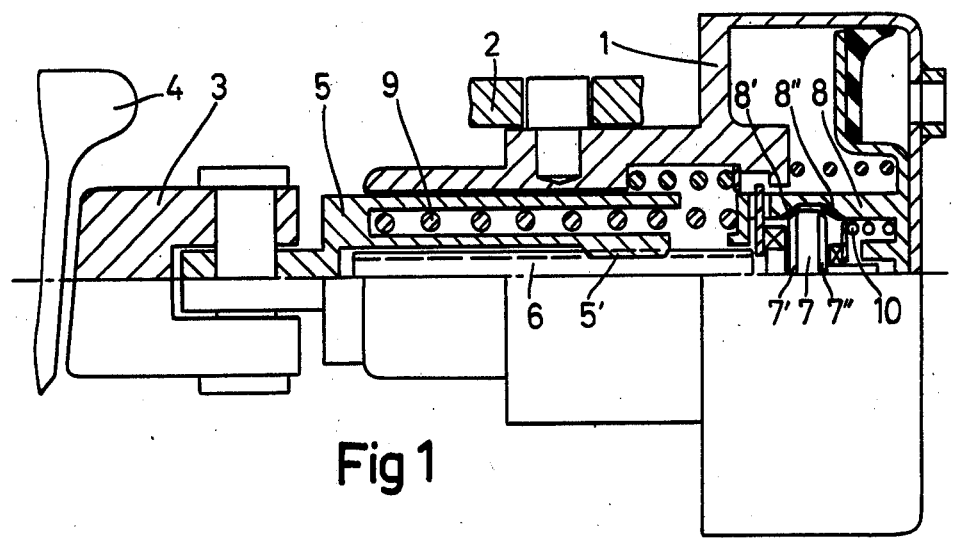

A brake unit with a built-in slack adjuster of this kind is described in our British Pat. No. 1,269,917 issued as U.S. Pat. No. 3,744,596, July 10, 1973. In this patent the slack adjuster in FIG. 1 is single-acting, whereas the one in FIG. 4 is double-acting. Irrespective of the slack adjuster type it is preferable to bring back the outgoing push rod of the unit from the outside, for example by means of a bar inserted between the brake block and the wheel tread, at a replacement of a wornout brake block. Due to the coopration of the different parts in the double-acting slack adjuster this is possible without any special measures, whereas in the single-acting slack adjuster the rear pair of clutch surfaces will be engaged and prevent the bringing back of the push rod.

The object of the invention is thus to accomplish a device of the kind referred to above and this is according to the invention attained in that this device is characterised by a member arranged between the rotatable element and a stationary part of the unit, the length of the member being such that with the piston fully retracted and the member applied against the stationary part the rotatable element at a movement backwards will be supported by the member in a condition with both pairs of clutch surfaces disengaged.

Figure 2:
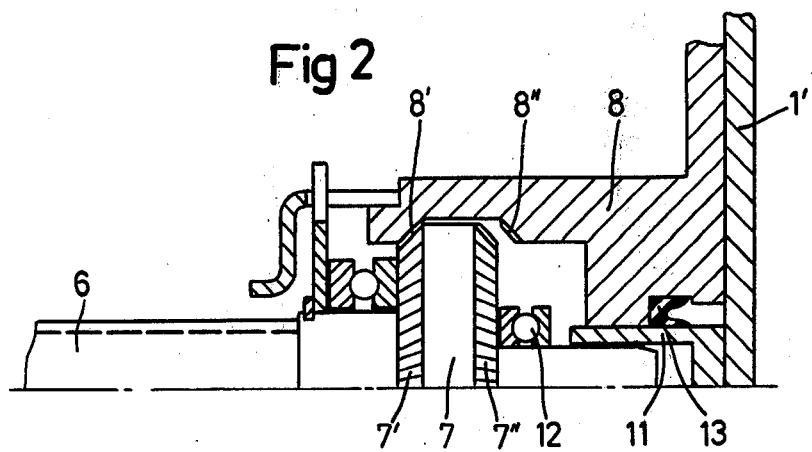

The invention shall be described in further detail below reference being made to the accompanying drawing, in which FIG. 1 is a partly cross-sectional view of a known brake unit including a double-acting slack adjuster, and FIG. 2 is a cross-sectional view of a device according to the invention.

The brake unit shown in FI. 1 corresponds to the one shown in FIG. 4 of our British Pat. No. 1,269,917 and therefore only parts of importance for the proper understanding of the present invention will be described below. Reference is made to the said patent for further information and description of the brake unit and the double-acting slack adjuster therein.

A brake unit housing 1 is mounted to a suitable part 2 of a vehicle underframe. A brake block 3 acting on a wheel 4 is attached to an outgoing push rod 5 of the unit.

A threaded spindle 6 is rotatably arranged and is in nonself-locking engagement with an internal nut thread 5' in the tubular push rod 5. A flange 7 on the spindle 6 is provided with two preferably toothed clutch surfaces 7' and 7" for cooperation with two corresponding clutch surfaces 8' and 8" on a piston 8. An adjuster spring 9 is arranged between the push rod 5 and the piston 8 in the shown way, so that the two front clutch surfaces 7' and 8' as viewed in the brake application direction are held in engagement, until a force on the push rod 5 in the direction opposite the brake application direction exceeds the spring force, which occurs at a normal brake applicaton or at a bringing back of the push rod 5 by means of a bar inserted between the brake block 3 and the wheel 4.

As said the slack adjuster shown in FIG. 1 is double-acting but can if desired easily be converted into a single-acting one by the removal of a compression spring 10 between the spindle 6 and the piston 8. After this removal, however, the bringing back of the push rod 5 at the described way will be impossible, as the rear clutch surfaces 7" and 8" will engage, when the force of the spring 9 is exceeded, and will prevent any rotation of the spindle 6.

In FIG. 2 there is shown a part of a brake unit with a single-acting slack adjuster, i.e. without the compression spring 10. In order to enable the push rod 5 to be brought back by means of a bar between the brake block 3 and the wheel 4 a sleeve or cup 11 is axially movably arranged in the piston 8 between a thrust bearing 12 on the spindle 6 and a part of the brake unit housing that can be called a cylinder end wall 1'. There is a sealing 13 around the sleeve 11 in the piston 8. The length of the sleeve 11 is such that when the piston 8 is in its fully retracted shown position, the spindle 6 at a movement backwards will be supported by the cylinder end wall 1' via the bearing 12 and the sleeve 11 in a condition with both pairs of clutch surfaces 7', 8' and 7", 8" disengaged. With other words, in the shown position with the piston 8 and sleeve 11 close to the cylinder end wall 1' the distance between the sleeve 11 and the bearing 12 is less than the distance between the rear clutch surfaces 7" and 8".

By the fact that the sleeve 11 is movably arranged in the piston and is exposed to the same fluid pressure as the piston 8 the sleeve 11 will follow the piston 8 forward but will not prevent the rear clutch surfaces 7", 8" from engaging under certain conditions, which is necessary for the proper functioning of the slack adjuster.

Under some circumstances it may be desirable to ensure a greater play for the spindle 6 in the shown position than can be allowed by the sleeve 11. In such a case it is necessary to have a somewhat shorter sleeve 11 and to push it forward by external means at the cylinder end wall 1' to the position shown in FIG. 2, when a worn-out brake block shall be replaced and thus when the push rod shall be brought back from the outside. These external means are not shown and form no part of the present invention.

It is to be noted that the invention also can be used for a brake unit with a somewhat differently designed slack adjuster. In the shown and described case the spindle 6 with its flange 7 is the rotatable element, whereas the nut 5' in non-self-locking engagement therewith is non-rotatable. It is, however, possible to have a design with a nut provided with a flange as the rotatable element and the spindle as a non-rotatable push rod of the unit. It is also possible to have a completely different design for the cup or sleeve coacting with any stationary part of the unit and not necessarily with the cyliner end wall.

I claim:

1. In an automatic adjuster unit having a single acting slack adjuster and movable piston fluid brake unit coupled to move a push rod toward a braking position, means for enabling the push rod to be returned against the single action of said adjuster, comprising in combination, an axially disposed rotatable element, a non-rotatable element, threads between said two elements in non-self-locking engagement permitting the rotatable element to rotate, a clutch having two clutch surfaces positioned on said rotatable element to engage mating clutch surfaces in opposite axial positions of said rotatable element, the said mating clutch surfaces disposed for movement with said piston, a spring biased to hold one axial pair of clutch surfaces engaged by the push rod in the brake applying direction so that the clutch surfaces can become disengaged when the push rod is returned by a pressure exceeding the spring force, and an axially movable member placed along said push rod to engage the clutch at the fully retracted piston position and hold the clutch surfaces axially in a position with both clutch surfaces disengaged.

* * * * *